(12) United States Patent
Hong et al.

(10) Patent No.: US 11,225,634 B2
(45) Date of Patent: Jan. 18, 2022

(54) BEVERAGE MAKER

(71) Applicant: LG Electronics Inc., Seoul (KR)

(72) Inventors: Jinpyo Hong, Seoul (KR); Daewoong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 495 days.

(21) Appl. No.: 16/193,369

(22) Filed: Nov. 16, 2018

(65) Prior Publication Data

US 2019/0144804 A1    May 16, 2019

(30) Foreign Application Priority Data

Nov. 16, 2017    (KR) .................. 10-2017-0153163

(51) Int. Cl.
*C12C 13/10*        (2006.01)
*C12C 11/00*        (2006.01)

(52) U.S. Cl.
CPC .............. *C12C 13/10* (2013.01); *C12C 11/00* (2013.01); *C12C 11/006* (2013.01)

(58) Field of Classification Search
CPC ........ C12C 13/10; C12C 11/00; C12C 11/006
USPC .............................. 99/276; 222/146.1, 399, 5
See application file for complete search history.

(56) References Cited

U.S. PATENT DOCUMENTS

| | | | | | |
|---|---|---|---|---|---|
| 3,433,148 A | * | 3/1969 | Sho | .................. | C12C 11/006 99/276 |
| 3,730,500 A | * | 5/1973 | Richards | ............. | B01F 3/04808 261/140.1 |
| 4,708,938 A | * | 11/1987 | Hickinbotham | ........ | C12C 13/10 435/297.2 |
| 4,921,135 A | * | 5/1990 | Fleet | ......................... | B67B 7/26 222/105 |
| 5,062,548 A | * | 11/1991 | Hedderick | ........... | B67D 1/0004 222/190 |
| 5,240,144 A | * | 8/1993 | Feldman | ............... | B67D 1/0001 222/105 |
| 5,244,117 A | * | 9/1993 | Lombardo | ........... | B67D 1/0456 141/3 |
| 5,251,787 A | * | 10/1993 | Simson | ................ | B67D 1/0462 222/105 |
| 6,598,763 B2 | * | 7/2003 | Van Der Meer | ......... | B01D 3/20 222/105 |
| 7,367,479 B2 | * | 5/2008 | Sitz | ..................... | B65D 81/2053 222/400.7 |
| 7,757,900 B2 | * | 7/2010 | Knauer | ............... | B05B 11/3064 222/207 |
| 8,601,936 B2 | * | 12/2013 | Williams | ............. | C12G 1/0206 99/281 |
| 9,242,845 B2 | * | 1/2016 | Otto | ..................... | B67D 1/0801 |

(Continued)

FOREIGN PATENT DOCUMENTS

| | | | | |
|---|---|---|---|---|
| EP | 2987767 | A1 * | 2/2016 | ............. C12C 13/02 |
| KR | 10-0793258 | | 1/2008 | |

*Primary Examiner* — Jimmy Chou
(74) *Attorney, Agent, or Firm* — Fish & Richardson P.C.

(57) ABSTRACT

A beverage maker includes a fermentation module including a fermentation tank that defines an inner space, and a lid that is configured to open and close at least a portion of the inner space, and a container configured to be accommodated in the inner space of the fermentation tank. The container includes a container channel configured to guide flow of fluid, and the lid includes a lid channel connected to the container channel, and a tube connected to the lid channel.

15 Claims, 5 Drawing Sheets

(56) References Cited

U.S. PATENT DOCUMENTS

| | | | |
|---|---|---|---|
| 9,895,667 B2* | 2/2018 | McDonald | B01F 3/04808 |
| 10,005,654 B2* | 6/2018 | Kraenzle | B67D 1/0462 |
| 10,017,722 B2* | 7/2018 | Glasgow | F16K 5/06 |
| 10,065,204 B2* | 9/2018 | Neal | B05B 11/046 |
| 10,253,284 B2* | 4/2019 | Blichmann | C12C 13/10 |
| 10,479,669 B2* | 11/2019 | Kim | B67D 1/00 |
| 10,486,956 B2* | 11/2019 | Ware | B67D 7/0288 |
| 10,508,257 B2* | 12/2019 | Park | C12C 11/006 |
| 10,773,944 B2* | 9/2020 | Maier | G06Q 30/02 |
| 10,808,213 B2* | 10/2020 | Park | C12C 13/10 |
| 10,865,369 B2* | 12/2020 | Rule | C12G 1/02 |
| 10,882,728 B2* | 1/2021 | Hong | B67D 1/0895 |
| 2003/0071067 A1 | 4/2003 | Sluijter | B67D 1/0462 |
| | | | 222/183 |
| 2004/0011828 A1* | 1/2004 | Van Der Klaauw | B67D 1/1405 |
| | | | 222/527 |
| 2007/0056990 A1* | 3/2007 | Pakkert | B67D 1/1405 |
| | | | 222/146.6 |
| 2007/0266713 A1* | 11/2007 | Matveev | C12C 11/006 |
| | | | 62/3.64 |
| 2008/0217361 A1* | 9/2008 | Vitantonio | B67D 1/1252 |
| | | | 222/399 |
| 2008/0217362 A1* | 9/2008 | Vitantonio | B67D 1/0418 |
| | | | 222/399 |
| 2009/0032272 A1* | 2/2009 | Duncan | A62C 13/64 |
| | | | 169/85 |
| 2009/0090741 A1* | 4/2009 | Oberhofer | B67D 1/0418 |
| | | | 222/5 |
| 2010/0129490 A1* | 5/2010 | Williams | C12C 11/006 |
| | | | 426/11 |
| 2012/0138161 A1* | 6/2012 | Wolthers | B67D 1/0462 |
| | | | 137/15.12 |
| 2012/0285998 A1* | 11/2012 | Peirsman | B67D 1/1272 |
| | | | 222/396 |
| 2013/0199376 A1* | 8/2013 | Rule | B65D 88/34 |
| | | | 99/276 |
| 2014/0097549 A1* | 4/2014 | Hoare | B01F 15/00253 |
| | | | 261/30 |
| 2015/0225222 A1* | 8/2015 | Jaffe | B67D 1/0885 |
| | | | 222/1 |
| 2015/0274501 A1* | 10/2015 | Lehman | B67D 1/0412 |
| | | | 222/556 |
| 2015/0336785 A1* | 11/2015 | Rege | B67D 1/1477 |
| | | | 222/1 |
| 2016/0152463 A1* | 6/2016 | Ware | B67D 7/0288 |
| | | | 222/1 |
| 2016/0201018 A1* | 7/2016 | Watson | A47J 27/08 |
| | | | 426/11 |
| 2016/0251209 A1* | 9/2016 | Standaert | B67D 1/0462 |
| | | | 222/95 |
| 2016/0326471 A1* | 11/2016 | Aown | C12C 11/00 |
| 2017/0107092 A1* | 4/2017 | Peirsman | B67D 1/0004 |
| 2017/0174495 A1* | 6/2017 | McIntyre | B67D 1/0891 |
| 2017/0267511 A1* | 9/2017 | Valles | B67D 1/0004 |
| 2017/0321173 A1* | 11/2017 | Glasgow | C12C 11/006 |
| 2018/0129361 A1* | 5/2018 | Suh | H04M 1/72412 |
| 2019/0039875 A1* | 2/2019 | Ware | B67D 1/1252 |
| 2019/0300827 A1* | 10/2019 | Liang | C12C 11/11 |

* cited by examiner

BEVERAGE MAKER

CROSS-REFERENCE TO RELATED APPLICATIONS

The present application claims priority under 35 U.S.C. 119 and 35 U.S.C. 365 to Korean Patent Application No. 10-2017-0153163, filed on Nov. 16, 2017, which is hereby incorporated by reference in its entirety.

FIELD

The present disclosure relates to a beverage maker, and more particularly, to a beverage maker that includes a fermentation module configured to ferment beverage ingredients.

BACKGROUND

Beverages are collectively referred to as drinkable liquids such as alcoholic drinks, coffee, soft drinks, juice, milk, or tea. For example, beverages may be divided into various categories such as water (e.g., spring water, sparkling water as a beverage) to quench thirst, juice beverages with unique flavor and taste, refreshing beverages giving refreshing sensation, or alcoholic beverages with an alcohol effect.

Beer is one example of alcoholic beverages. The beer is an alcoholic beverage that can be produced by making juice of malt sprouting from barley, filtering the juice, adding hop, and fermenting the juice by using the yeast.

Consumers may purchase ready-made beer that is made and sold by a beer maker or house beer (or handmade beer) that is made by fermenting beer ingredients at home or in a bar.

House beer may be made in a variety of types, and may be made according to the consumer's taste.

The ingredients for making beer may include water, malt, hop, yeast, flavoring additives, and the like.

The yeast, which is sometimes called leaven, may be added to malt, ferment the malt, and help to produce alcohol and carbonic acid.

The flavor additives may enhance the taste of beer with flavors such as fruit and the like.

The house beer may be made through three stages, which includes, for example, a wort production stage, a fermentation stage, and an aging stage. In some cases, it may take about two to three weeks from the wort production step to the aging stage.

In some cases, an optimum temperature may be maintained during the fermentation stage. The user's convenience may be improved if more the beer is produced in a simply way.

It is of interest to develop a beverage maker that can produce fermented beverages such as beer in a safe and simple way.

SUMMARY

The present disclosure provides a beverage maker that includes a fermentation module that can be maintained in a clean state and that can facilitate introduction of beverage ingredients or dispense of the beverage.

According to one aspect of the subject matter described in this application, a beverage maker includes a fermentation module including a fermentation tank that defines an inner space, and a lid that is configured to open and close at least a portion of the inner space, and a container configured to be accommodated in the inner space of the fermentation tank. The container includes a container channel configured to guide flow of fluid, and the lid includes a lid channel connected to the container channel, and a tube connected to the lid channel.

Implementations according to this aspect may include one or more of the following features. For example, the lid may define a tube through-hole configured to receive the tube, and a tube accommodating space located inside of the lid and configured to accommodate a portion of the tube inserted into the tube through-hole. In some examples, the tube includes an inner tube portion disposed in the tube accommodating space and configured to connect to the lid channel, and an outer tube portion that extends from the inner tube portion and that is disposed outside of the fermentation tank.

In some implementations, the lid further includes an outer lid, an inner lid disposed at the outer lid and configured to rotate relative to the fermentation tank, and a hinge member connected to the outer lid and rotatably connected to the fermentation tank. In some examples, the outer lid and the inner lid define a tube through-hole configured to receive the tube, where the inner lid defines a tube accommodating space located inside of the inner lid and configured to accommodate a portion of the tube inserted into the tube through-hole.

In some implementations, the lid further includes a tube cover connected to the outer lid and configured to cover the tube. In some examples, the tube cover defines a cover through-hole configured to receive the tube, where at least one of the hinge member or the tube cover defines a tube accommodating space configured to accommodate a portion of the tube between the hinge member and the tube cover.

In some implementations, the lid channel has an end that extends to an outside of the lid, where the tube is connected to the end of the lid channel at the outside the lid. In some examples, the lid channel includes one or more bent portions. In some examples, a portion of the tube is disposed between the lid and the fermentation tank. In some examples, the fermentation tank defines a tube through-hole configured to receive the tube.

In some implementations, the fermentation tank includes a lower fermentation tank that defines the inner space, and a lid connector that is disposed at the lower fermentation tank, that is configured to connect to the lid, and that defines the tube through-hole. In some examples, the lid connector has a top surface that defines a lid seating groove configured to seat the lid.

In some implementations, the beverage maker further includes a tube cover configured to surround a portion of an outer surface of the tube, where the lid connector defines a tube cover accommodating space configured to accommodate the tube cover. In some examples, the tube cover defines a cover through-hole configured to receive the tube.

According to another aspect, a beverage maker includes: a fermentation tank that defines an inner space; a container that is configured to be accommodated in the inner space and that includes a container channel configured to guide flow of fluid; a lid connected to the fermentation tank through a hinge member and configured to open and close at least a portion of the inner space, where the lid includes a lid channel connected to the container channel; and a tube connected to the lid channel. The lid defines a tube through-hole configured to receive the tube, and a tube accommodating space configured to accommodate a portion of the tube inserted into the tube through-hole.

Implementations according to this aspect may include one or more of the following features or the features described above. For example, the tube extends along a lower side of the hinge member. In some implementations, the beverage maker further includes a tube cover configured to surround a portion of an outer surface of the tube, where the fermentation tank defines a tube cover accommodating space configured to accommodate the tube cover.

According to another aspect, a beverage maker includes: a fermentation tank that defines an inner space; a container that is configured to be accommodated in the inner space and that includes a container channel configured to guide flow of fluid; a lid connected to the fermentation tank through a hinge member and configured to open and close at least a portion of the inner space, where the lid includes a lid channel connected to the container channel; and a tube connected to the lid channel. The lid channel has an end that extends to an outside of the lid, and the tube is connected to the end of the lid channel at the outside the lid.

Implementations according to this aspect may include one or more of the following features or the features described above. For example, a portion of the tube extends along a lower side of the hinge member.

The details of one or more implementations are set forth in the accompanying drawings and the description below. Other features will be apparent from the description and drawings, and from the claims.

DETAILED DESCRIPTION

Hereinafter, detailed implementations of the present disclosure will be described in detail with reference to the accompanying drawings.

Although beer is exemplified as a beverage made by a beverage maker in this specification, a kind of beverages may include, but not be limited to, beer that is capable of being made by the beverage maker. For example, various kinds of beverages may be made through the beverage maker according to some implementations.

Figure 1:
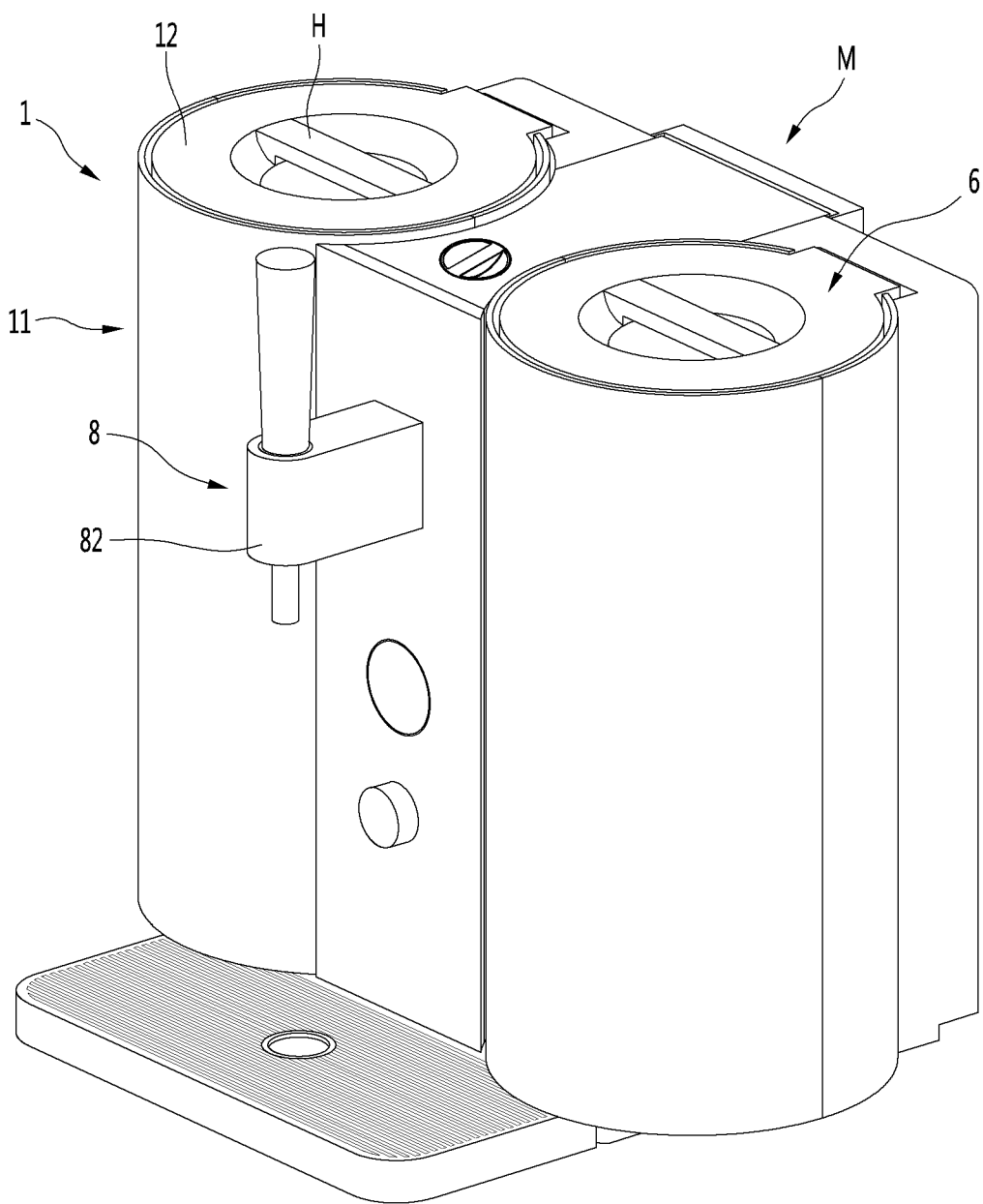
FIG. 1 is a perspective view of an example beverage maker.
Figure 2:
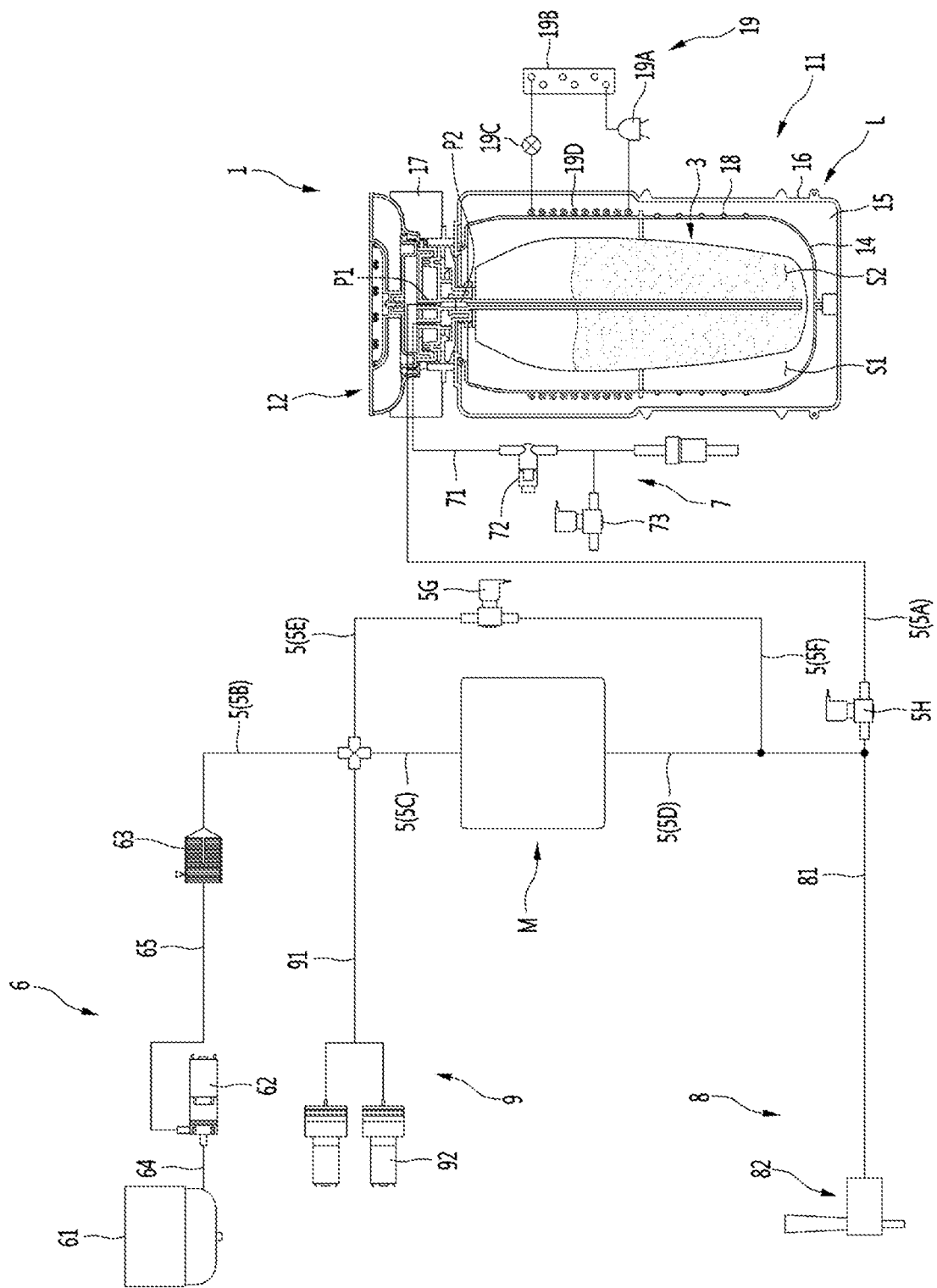
FIG. 2 is a view illustrating an example configuration of an example beverage maker.

FIG. 1 is a perspective view of an example beverage maker according to an implementation, and FIG. 2 is a view illustrating an example configuration of an example beverage maker.

A beverage maker may include a fermentation module 1 and a container 3.

A space S1 in which the container 3 is accommodated may be defined in the fermentation module 1.

The fermentation module 1 may be provided as an assembly of a plurality of members. The fermentation module 1 includes a fermentation tank 11 having the space S1 therein and a lid 12 opening and closing the space S1.

An upper portion of the fermentation tank 11 defines an opening through which the container 3 is accessible.

The lid 12 may have a size greater than a size of the opening of the fermentation tank 11 to open and close the opening.

The lid 12 may be rotatably or slidably connected to the fermentation tank 11.

The lid 12 may be hinge-connected the fermentation tank 11. The lid 12 may be manipulated by a user in the state of being connected to the fermentation tank 11.

A container support portion supporting the container 3 may be disposed on at least one of the fermentation tank 11 and the lid 12.

In some examples, the container support portion may be a container seating portion configured to seat the container 3 thereon.

The container support portion may be the container seating portion provided on an upper portion of the fermentation tank 11 so that an upper portion of the container 3 is seated. In this case, the container 3 may be accommodated in the space S1 in the state of being seated on the container seating portion.

In some examples, the container support portion may be a container connecting portion connected so that the container 3 is hung.

The container support portion may be the container connecting portion provided on the lid 12 and connected to an upper portion of the container 3. In this case, the container 3 may be inserted and accommodated in the space S1 in the state in which the upper portion of the container 3 is connected to the container connecting portion.

When the container 3 is mounted, the user may open the lid 12 to insert the container 3 into the space S1. Then, the user may close the lid 12 in the state in which the container 3 is seated on the container seating portion or connected to the container connecting portion.

When the user closes the lid 12, the lid 12 may seal an opening of the fermentation tank 11, and the container 3 may make a beverage in a state of being accommodated in the sealed space between the fermentation tank 11 and the lid 12.

Hereinafter, a detailed configuration of the fermentation tank 11 will be described as follows.

The fermentation tank 11 may be provided as an assembly of a plurality of members. The fermentation tank 11 may include an inner fermentation tank 14 having the space S1 therein and an insulation material 15 surrounding the inner fermentation tank 14. The fermentation tank 11 may further include an outer fermentation tank 16 surrounding the insulation material 15.

The inner fermentation tank 14, the insulation material 15, and the outer fermentation tank 16 may constitute a lower fermentation tank L having the space S1 therein and insulating the space S1.

The fermentation tank 11 may include a lid connector 17 to which the lid 12 is connected. The lid 12 may be hinge-coupled to the lid connector 17.

The lid connector 17 may be an upper fermentation tank disposed on an upper portion of the lower fermentation tank L.

In some implementations, the beverage maker may include a temperature controller that is capable of heating or cooling the inner fermentation tank 14. The temperature controller may include a heater 18 disposed on an outer surface of the inner fermentation tank 14.

In some examples, the temperature controller may include a refrigerant cycle device 19 or a thermoelectric module for heating or cooling the inner fermentation tank 14.

When the temperature controller includes the refrigerant cycle device 19, the temperature controller may include a compressor 19A compressing a refrigerant, a condenser 19B condensing the refrigerant compressed in the compressor 19A, an expansion mechanism 19C decompressing the refrigerant condensed in the condenser 19B, and an evaporator 19D evaporating the refrigerant expanded by the expansion mechanism 18C. The evaporator 19D may include an evaporation tube disposed on the outer surface of the inner fermentation tank 14.

The evaporator 19D may be disposed inside the insulation material 15, and the compressor 19A, the condenser 19B, and the expansion mechanism 19C may be disposed outside the fermentation tank 11.

When the temperature controller includes the thermoelectric module, the temperature controller may include a heat absorption plate, a heat dissipation plate, and a thermoelectric element between the heat absorption plate and the heat dissipation plate.

The container 3 may be inserted into the space S1 of the fermentation module 1 and assist the making of the beverage in the state of being accommodated in the space S1.

The container 3 may be used in the state of being accommodated in the sealed space between the fermentation tank 11 and the lid 12. The container 3 may be inserted and accommodated into the space S1 of the fermentation tank 11. A fermentation space S2 in which the beverage ingredients are contained and fermented may be defined in the container 3.

The beverage ingredients may be fermented in the state of being accommodated in the container 3, and the fermented beverage ingredients may be dispensed from the inside of the container 3 to the outside. That is, the container 3 may be a fermentation container that assists the fermentation of the beverage ingredients.

As illustrated in FIG. 1, the beverage maker may further include a main channel 5.

The main channel 5 may be connected to at least one of the fermentation module 1 or the container 3.

The main channel 5 may guide the beverage ingredients such as water or additives to the container 3. The main channel 5 may include a connecting channel 5A connected to at least one of the fermentation module 1 or the container 3.

The main channel 5 may be connected to at least one of a water supply source 6 or an ingredient supplier M to guide the water flowing from the water supply source 6 or the beverage ingredients fed from the ingredient supplier M.

The water supplied from the water supply source 6 may be supplied to the container 3 through the main channel 5. The main channel 5 may include a water supply channel 5B connected to the water supply source 6.

The water supply source 6 is configured to supply the water to the main channel 5. Various water supply sources may be applied to the water supply source 6 as long as the water supply sources supply the water to the main channel 5.

For example, the water supply source 6 may include a water tank 61 containing water and a water supply pump 62 for pumping the water within the water tank 61 to the main channel 5. The water supply source 6 may further include a water supply heater 63 disposed between the water supply pump 62 and the main channel 5 to heat the water.

When the water supply source 6 includes a plurality of components 61, 62, and 63, the components may be connected to each other through the water supply channel. The water supply channel may be defined by a water supply tube through which the water passes. When the water supply source 6 includes the water supply pump 62 and the water supply heater 63, the water supply source 6 may include a first water supply channel 64 connecting the water tank 61 to the water supply pump 62 and a second water supply channel 65 connecting the water supply pump 62 to the water supply heater 63.

As another example, the water supply source 6 may be provided as an external water supply source such as a faucet. The main channel 5 may include a water supply channel 5B connected to the water supply source 6. In some examples, a water supply valve for interrupting the water supplied from the external water supply source may be installed in the water supply channel 5B.

The ingredient supplier M may have a space in which the beverage ingredients such as yeast or hop are accommodated and be connected to the main channel 5.

The beverage ingredients used for making the beverage in the beverage maker may include water, main ingredients, and additives.

The main ingredients may be put into the space S1 of the fermentation module 1 together with the container 3 in the state of being accommodated in the container 3.

The water or the additives may be supplied from the outside of the container 3 to the container 3 through the main channel 5. The water or the additives may be supplied to the container 3 through the main channel 5 in the state in which the space S1 of the fermentation tank 11 is sealed by the lid 12.

When the beverage maker includes the ingredient supplier M, the main channel 5 may include an ingredient supplier water supply channel 5C supplying the water supplied from the water supply source 6 to the ingredient supplier M and an ingredient supplier water discharge channel 5D guiding the water and the beverage ingredients discharged from the ingredient supplier M.

In some implementations where the beverage maker includes the ingredient supplier M, the main channel 5 may further include bypass channel 5E and 5F for allowing the water supplied from the water supply source 6 to bypass the ingredient supplier M. Each of the bypass channel 5E and 5F may have one end connected to communicate with at least one of the ingredient supplier water supply channel 5C or the water supply channel 5B, and the other end connected to communicate with at least one of the ingredient supplier water discharge channel 5D or the connecting channel 5A.

In some implementations, the main channel 5 further includes the bypass channel 5E and 5F. The beverage maker may further include a bypass valve 5G installed in the bypass channel 5E and 5F to open and close the bypass channel 5E and 5F. In some examples, the beverage maker further includes the bypass valve 5G, and the bypass channel 5E and 5F may include a first bypass channel 5E between the water supply channel 5B and the bypass valve 5G and a second bypass channel 5F between the bypass valve 5G and the connecting channel 5A.

In some implementations, the beverage maker may further include a gas discharger 7 guiding a gas within the container 3 to the outside of the fermentation module 1.

The gas discharger 7 may include a gas discharge channel 71 connected to the fermentation module 1 or the container 3. The beverage maker may include a pressure sensor 72 installed in the gas discharge channel 71. The gas discharger 7 may further include a gas discharge valve 73 installed in the gas discharge channel 71 to discharge the gas to the outside. When the beverage maker includes all of the pressure sensor 72 and the gas discharge valve 73, the gas discharge valve 73 may be connected behind the pressure sensor 72 in a gas discharge direction.

In some implementations, The beverage maker may further include a beverage dispenser 8 for dispensing the fermented beverage within the container 3 to the outside.

The beverage dispenser 8 may include a beverage dispensing channel 81 guiding the beverage dispensed from the container 3 and a dispenser 82 connected to the beverage dispensing channel 81 to dispense the beverage guided to the beverage dispensing channel 81 to the outside of the beverage maker.

The beverage dispensing channel 81 may be connected to the main channel 5. The beverage moving from the container 3 to the main channel 5 may flow to the dispenser 82 through the beverage dispensing channel 81. The beverage dispensing channel 81 may be connected to a portion of the main channel 5, which is disposed outside the fermentation module 1. When the beverage maker includes the ingredient supplier M, the beverage dispensing channel 81 may be connected between the ingredient supplier M and the fermentation module 1 in the main channel 5.

The beverage maker may further include a gas injector 9 for injecting a gas such as air into the container 3.

The gas injector 9 may be connected to the main channel 5 to inject a gas through the main channel 5. For example, the gas injector 9 may be connected to the fermentation module 1 or the container 3 to inject a gas through the fermentation module 1 or the container 3.

When the gas injector 9 is connected to the main channel 5, the gas injector may include a gas injection channel 91 connected to the main channel 5 and a gas pump connected to the gas injection channel 91.

The beverage maker may further include a main valve 5H installed in the main channel 5 to open and close the main channel 5.

The main valve H5 may be opened when water is supplied to the container 3 to supply the water supplied from the water supply source 6 to the container 3. The main valve 5H may be opened when the gas is injected by the gas injector 9 to supply the gas injected from the gas injector 9 to the container 3. The main valve 5H may be opened when the ingredients within the ingredient supplier M are put into the container 3 to supply the ingredients within the ingredient supplier M to the container 3. The main valve 5H may be opened when the beverage made in the container 3 is dispensed to dispense the beverage within the container 3 to the outside through the beverage dispenser 8.

Figure 3:
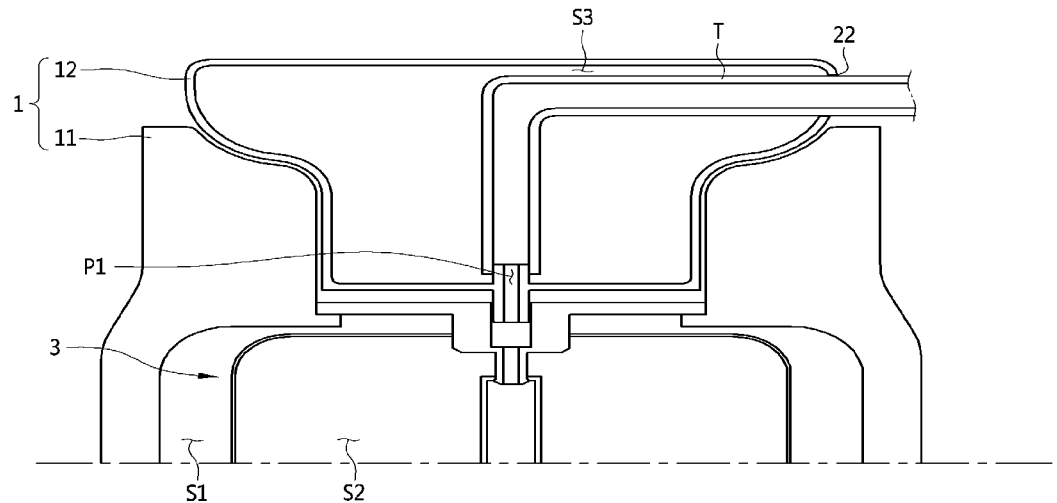
FIG. 3 is a schematic view illustrating an example fermentation module, an example container, and an example tube of an example beverage maker.
Figure 4:
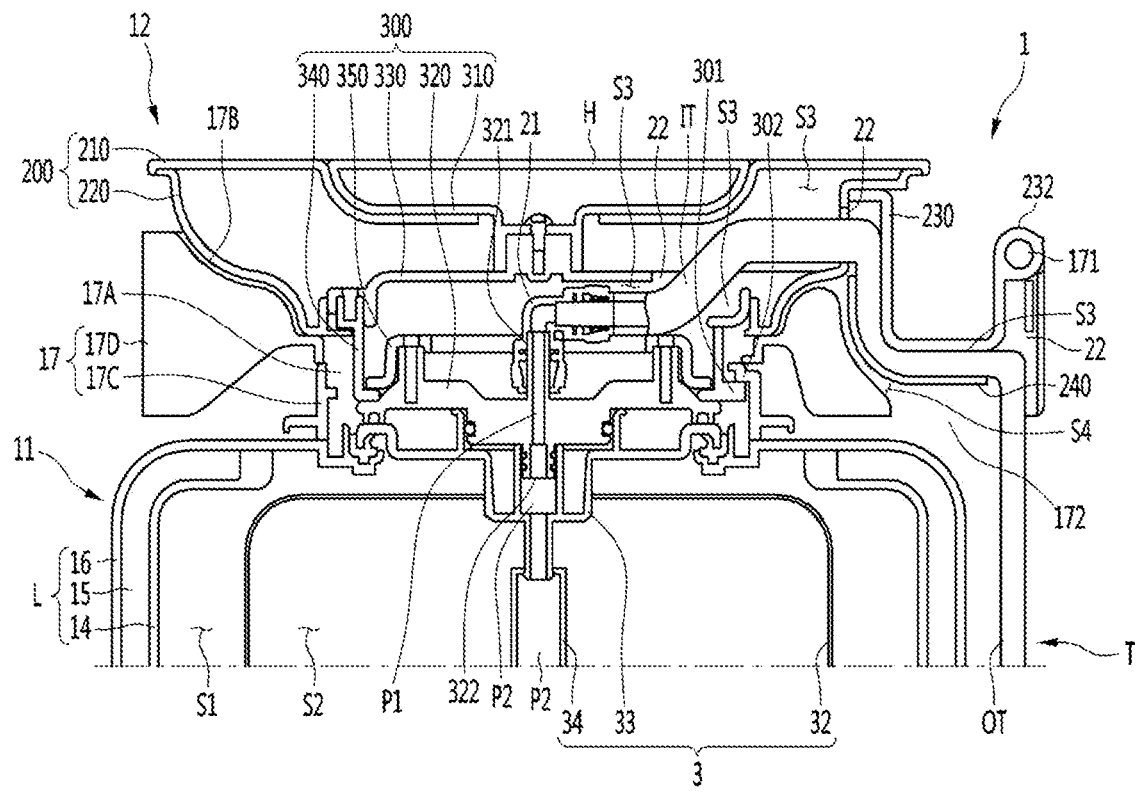
FIG. 4 is a cross-sectional view illustrating the fermentation module and the container of the beverage maker of FIG. 3.

FIG. 3 is a schematic view of an example fermentation module, an example container, and an example tube of an example beverage maker, and FIG. 4 is a cross-sectional view illustrating the fermentation module and the container of the beverage maker of FIG. 3.

As illustrated in FIG. 4, an opening 17A through which the container 3 is accessible may be defined in the lid connector 17.

The opening 17A may communicate with the space S1 of the inner fermentation tank 14 and be defined with a size less than that of the space S1 in an upper portion of the space S1.

At least a portion of the lid 12 may be inserted into the opening 17A of the lid connector 17 to seal the opening 17A of the lid connector 17.

The lid 12 may have an upper portion having a size greater than that of the opening 17A and a lower portion having a size less than that of the opening 17A. The lower portion of the lid 12 may be inserted and accommodated into the opening 17A, and the upper portion of the lid 12 may block the opening 17A.

A lid seating groove 17B in which the lid is seated may be defined in a top surface of the lid connector 17.

The lid connector 17 may include a neck body 17C in which the opening 17A is defined and a top body 17D in which the lid seating groove 17B, on which the lid 12 is seated, is defined.

The neck body 17C may be disposed on the lower fermentation tank L. The neck body 17C may have a size less than that of each of the lower fermentation tank L and the top body 17D. The top body 17D may be disposed on the neck body 17C. The top body 17D may have a size less than that of the neck body 17C. The top body 17D may be integrated with the neck body 17C. Alternatively, the top body 17D may be provided as a separate constituent with respect to the neck body 17C and then connected to the neck body 17C so that the top body 17D is disposed on the neck body 17C.

A container channel P2 through which a fluid passes may be provided in the container 3. The fluid may flow into and from the container 3 through the container channel P2.

The container channel P2 may communicate with the fermentation space S2. The ingredients such as a gas (for example, air), water, and additives may be introduced into the fermentation space S2 through the container channel P2. The container channel P2 may be an ingredient supply hole through which the ingredients for making a beverage are introduced into the fermentation space S2.

The beverage made in the fermentation space S2 may be dispensed to the outside of the container 3 through the container channel P2. The container channel P2 may be a beverage dispensing hole through which the beverage made in the fermentation space S2 is dispensed to the outside.

The container 3 may be provided as an assembly of a plurality of members. The container 3 may include a flexible container 32 and a container body 33. The container 3 may further include a container tube 34.

The flexible container 32 may be expanded or compressed. The fermentation space S2 may be defined in the flexible container 32.

Before the beverage is made, the fermentation space S2 may be an accommodating space accommodating the beverage ingredients. When the beverage is being made by the beverage maker, the fermentation space S may be a space in which the ingredients are being fermented.

The flexible container 32 may be connected to the container body 33. The flexible container 32 may be expanded or compressed in a state of being bonded to the container body 33.

The flexible container 32 may include a pair of films. A beer making space S2 may be defined between the pair of films.

Edges of the pair of films may be bonded to each other, and the flexible container 32 may be expanded and contracted.

One of the pair of films may be a bonded film bonded to the container body 33, and the other film may be a non-bonded film that is not boned to the container body 33.

The flexible container 32 may be expanded while the beverage is made in the space S1 of the fermentation tank 11 of the container 3.

The flexible container 32 may have a maximally compact shape before the container 3 is used for the beverage maker. Then, the flexible container 32 may be expanded during the use in the beverage maker.

In the flexible container 32, an upper film, which is disposed at a relatively upper side, of the pair of films may be bonded to the container body 33, and a lower film, which is disposed at a relatively lower side, of the pair of films may not be bonded to the container body 33.

The container body 33 may be seated on or connected to the container support portion provided in the fermentation module 1. The container channel P2 may be provided in the container body 33.

The container body 33 may be provided as an assembly of a plurality of members. The container body 33 may include a channel body in which the container channel P2 is provided and a bonded body connected to the channel body and bonded to the flexible container 32.

The container tube 34 may be detached from a lower portion of the container body 33. The container channel P2 communicating with the fermentation space S2 of the container 3 may be provided in the container tube 34.

The beverage maker according to an implementation may further include a tube T.

The tube T may be connected to the container 3 or the fermentation module 1. The tube T may be directly connected to the container 3 or connected to the container 3 through the fermentation module 1.

The beverage ingredients such as water and additives may be guided to the container 3 through the tube T.

The beverage made in the container 3 may be dispensed to the outside through the tube T.

A gas within the container 3 may be discharged to the outside through the tube T.

The beverage maker may inject the gas such as air into the container 3 while making the beverage and may discharge the gas such as the air, which is injected into the container 3, to the outside of the fermentation module 1.

In the beverage maker, a gas such as a carbon dioxide gas may be generated in the beverage ingredients during the fermentation of the beverage ingredients. The gas may be discharged to the outside of the fermentation module 1 through the tube T.

At least one tube T may be provided in the beverage maker.

The beverage maker may include one tube. The one tube may be shared for putting the beverage ingredients such as the water or additives, dispensing the made beverage, and discharging the gas.

The beverage maker may include a plurality of tubes. One of the tubes may be used for putting the beverage ingredients, injecting the gas such as the air, and guiding the dispensing of the made beverage, and the other tube may be used for guiding the discharge of the gas flowing through the inside of the container 3.

When the plurality of tubes T are provided in the beverage maker, one tube of the plurality of tubes may be a main tube for guiding the beverage ingredients, the gas such as the air, and the made beverage. Also, the other tube of the plurality of tubes may include a gas tube for guiding the gas flowing through the inside of the container 3.

Here, the main tube may constitute at least a portion of the main channel 5 of FIG. 2. The main tube may be a connecting channel 5A of the main channel 5 of FIG. 2.

Also, the gas tube may also constitute at least a portion of the gas discharge channel 71 of FIG. 2.

Each of the main tube and the gas tube may be connected to one of the container 3 or the fermentation module 1, and may also have the same structure as one of the container 3 or the fermentation module 1 so as to be connected to each other.

Hereinafter, for convenience, each of the main tube and the gas tube may be called as the tube T.

The tube T may be connected to the container 3 through the fermentation module 1. In this case, the tube T may be connected to the container channel P2 through the lid 12.

A lid channel P1 may be provided in the lid 12.

The lid channel P1 may be configured to connect the tube T to the container channel P2. The container channel P2, the lid channel P1, and the tube T may provide a passage for guiding the fluid.

The fluid may pass through the lid channel P1. The lid channel P1 may be connected to the container channel P2. In the state in which the container 3 is accommodated in the space S1 of the fermentation tank 11, when the lid 12 is closed, the lid channel P1 may be connected to the container channel P2. On the other hand, in the state in which the lid channel P1 is connected to the container channel P2, when the lid 12 is opened, the lid channel P1 may be separated from the container channel P2.

In some examples, the lid channel P1 is provided in the lid 12 in which the tube T may be connected to the lid 12.

The beverage ingredients such as the water or additives or the gas such as the air may be supplied into the container 3 by passing through the lid channel P1 after being introduced from the tube T into the lid channel P1. The beverage made in the container 3 may flow from the inside of the container 3 to the lid channel P1 to pass through the lid channel P1 and then be guided to the tube T.

The tube T may be directly connected to the lid channel P1. In some implementations, as illustrated in FIG. 3, the tube T may be connected to the lid channel P1 through a separate connecting member 21.

Here, the connecting member 21 may be a fitting member connecting the lid channel P1 to the tube T between the lid channel P1 and the tube T.

Hereinafter, all of the case in which the tube T is directly connected to the lid channel P1 and the case in which the tube T is connected to the lid channel P through the connecting member 21 will be described as the case in which the tube T is connected to the lid channel P1.

The tube T may be connected to the lid channel P1 inside the lid 12 or be connected to the lid channel P1 outside the lid 12.

FIG. 3 illustrates an example in which the tube T is connected to the lid channel P inside the lid 12. A tube through-hole 22 through which the tube T passes may be defined in the lid 12. Also, a tube accommodating space S3 accommodating the portion of the tube T, which is inserted into the tube through-hole 22, may be defined in the lid 12. As illustrated in FIG. 3, the portion of the tube T, which is accommodated in the tube accommodating space S3, may be connected to the lid channel P1.

A portion of the tube T may be disposed inside the fermentation module 1, and a remaining portion may be disposed outside the fermentation module 1.

The tube T may include an inner tube portion IT and an outer tube portion OT.

The inner tube portion T1 may be a portion connected to the lid channel P1 in the tube accommodating space S3, and the outer tube portion OT may be a portion that extends outward from the fermentation module 1 in the inner tube portion IT and is disposed outside the fermentation module 1.

That is, the inner tube portion IT may be a portion of the tube T, which is disposed inside the lid 12. Also, the outer tube portion OT may be a portion extending to the outside of the lid 12, particularly, the fermentation module 1 in the inner tube portion IT.

In this implementation, the tube accommodating space S3 in which the inner tube portion IT is accommodated may be defined in the lid 12, and the tube through-hole 22 through which the tube T passes may be defined in the lid 12. Here, a portion of the tube T (i.e., the inner tube portion IT) may pass through the tube through-hole 22 and then be disposed inside the lid 12 as an example.

The inner tube portion IT may be protected by the lid 12 in the state of being connected to the lid channel P1.

Hereinafter, the lid 12 and the tube T will be described in more detail with reference to FIG. 3.

The lid 12 may rotate from the fermentation tank 11 in an upward direction to open the opening 17A of the fermentation tank 11. In the state in which the opening 17A of the fermentation tank 11 is opened, the lid 12 may rotate downward to close the opening 17A of the fermentation tank 11.

The lid 12 may include an outer lid 200 and an inner lid 300 rotatably disposed on the outer lid 200.

The outer lid 200 may include an upper outer lid 210 and a lower outer lid 220 coupled to the upper outer lid 210.

The tube through-hole 22 through which the tube T passes may be defined in the outer lid 200. The tube through-hole 22 may be defined in the lower outer lid 220. The tube accommodating space S3 in which a portion of the tube T is accommodated may be defined in the lower outer lid 220.

The lid 12 may include a hinge member 230 rotatably connected to the fermentation tank 11.

The hinge member 230 may be connected to at least one of the upper outer lid 210 or the lower outer lid 220. The hinge member 230 may be connected to the outer lid 200 among the outer lid 200 and the inner lid 300.

The hinge member 230 may include a hinge shaft connecting portion 232. The hinge shaft connecting portion 232 may be rotatably connected to a hinge shaft 171 provided in the fermentation tank 11.

The hinge shaft 171 may be provided in a lid connector 17 of the fermentation tank 11, and the lid 12 may rotate about the hinge shaft 171 in the state in which the hinge shaft connecting portion 232 is rotatably connected to the hinge shaft 171.

The hinge shaft 171 may serve as a horizontal central axis horizontally defined in the lid connector 17. The lid 12 may rotate about the horizontal central axis.

A portion of the tube T may be disposed below the hinge member 230.

The lid 12 may include a tube cover 240 protecting the tube T.

The tube cover 240 may be connected to the outer lid 200 of the outer lid 200 and the inner lid 300. The tube cover 240 may be connected to the hinge member 230. That is, the tube cover 240 may be connected to at least one of the outer lid 200 or the hinge member 230.

The tube cover 240 may be disposed to surround a portion of an outer surface of the tube T. The tube cover 240 may cover a portion of the tube at the outer so that the portion of the tube T is invisible when the lid 12 is lifted upward.

The tube accommodating space S3 into which the tube T is accommodated may be defined between the hinge member 230 and the tube cover 240. The tube T may be protected by the hinge member 230 and the tube cover 240 between the hinge member 230 and the tube cover 240. A portion of the tube T between the hinge member 230 and the tube cover 240 may be disposed along a lower side of the hinge member 230.

The tube cover 240 may fix a portion of the tube T to the hinge member 230. The tube cover 240 may fix a portion of the tube T between the hinge member 230 and the tube cover 240 to the hinge member 230.

The tube through-hole 22 through which the tube T passes may be defined in the tube cover 240.

When the lid 12 is closed, an accommodating space S4 into which the tube cover 240 or the hinge member 230 is inserted and accommodated may be defined in the fermentation tank 11.

When the lid 12 is closed, the tube cover 240 and the hinge member 230 may be accommodated in the accommodating space S4. The accommodating space S4 may be provided in the lid connector 17 in a recessed shape.

In some implementations, the lid 12 does not include the tube cover 240 but includes the hinge member 230 in which the accommodating space S4 may be a space into which the hinge member 230 is inserted and accommodated.

In some cases, when the lid 12 includes all of the tube cover 240 and the hinge member 230, the accommodating space S4 may be a space into which the tube cover 240 and the hinge member 230 are inserted and accommodated together with each other.

Hereinafter, the accommodating space S4 defined in the fermentation tank 11 will be called a tube cover accommodating space S4.

The tube T may be disposed to pass through the fermentation tank 11, and a tube through-hole 172 through which the tube T passes may be defined in the fermentation tank 11.

The tube through-hole 172 through which the tube T pass through the lid connector 17 of the lower fermentation tank L and the lid connector 17 may be defined in the fermentation tank 11.

The inner lid 300 may rotate in one direction of a clockwise direction and a counterclockwise direction with respect to a vertical axis and then be inserted into the lid connector 17. The inner lid 300 may rotate in the other direction of a clockwise direction and a counterclockwise direction with respect to a vertical axis and then be separated from the lid connector 17.

The inner lid 300 may be rotatably disposed on the outer lid 200 and thus be fitted into or separated from the lid connector 17 in a screw manner.

A fitting rib 301 that is fitted into or separated from the lid connector 17 in the screw member may protrude from one of the inner lid 300 or the lid connector 17. A hook protrusion 302 hooked with the fitting rib 301 may protrude from the other one of the inner lid 300 or the lid connector 17.

The inner lid 300 may be provided as an assembly of a plurality of members. The inner lid 300 may include a handle body 310 and a lid channel body 320 in which the lid channel P1 is provided.

A handle H that is held by a user to rotate may be provided on the handle body 310. The handle H may be disposed on an upper portion of the handle body 310.

The lid channel P1 may be lengthily disposed on the lid channel body 320 in a vertical direction. A tube communication portion 321 may be provided in the lid channel body 320, and a container communication portion 322 may be provided in a lower portion of the lid channel body 320.

The tube communication portion 321 may protrude upward from the lid channel body 320, and the tube T or the connecting member 21 may be connected to the tube communication portion 321. The tube T or the connecting member 21 may be inserted into the inside or outside of the tube communication portion 321.

The container communication portion 322 may protrude from the lid channel body 320 downward. When the lid 12 is closed, the container communication portion 322 may be inserted into the container channel P2 to communicate with the container channel P2. When the user opens the lid 12, the container communication portion 322 may be separated from the inside of the container channel P2 to an upper side of the container channel P2 and thus be separated from the container channel P2.

The lid channel P1 may be lengthily disposed from an upper end of the tube communication portion 321 to a lower end of the container communication portion 322 in the vertical direction.

The lid channel body 320 may be connected to rotate together with the handle body 310 when the handle body 310 rotates.

The lid channel body 320 may be directly connected to the handle body 310 or be connected to the handle body 310 through connecting body 330, 340, and 350.

The connecting body 330, 340, and 350 may be connected so that the lid channel body 320 is disposed below the handle body 310. The lid channel body 320 may be connected to the connecting body 330, 340, and 350 so as to be vertically spaced apart from the handle body 310.

The connecting body 330, 340, and 350 may define the tube accommodating space S3 together with the lid channel body 320. That is, the tube accommodating space S3 into which the inner tube portion IT of the tube T is accommodated may be defined between the connecting body 330, 340, and 350 and the lid channel body 320.

The tube through-hole 22 through which the tube T passes may be defined in the connecting body 330, 340, and 340.

Each of the connecting body 330, 340, and 350 may be provided as an assembly of a plurality of members. Each of the connecting body 330, 340, and 350 may include an upper connecting body 330.

The upper connecting body 330 may be connected to the handle body 310 so as to be spaced apart from the lid channel body 320 in the vertical direction, and the tube accommodating space S3 may be defined between the upper connecting body 330 and the lid channel body 320. The tube through-hole 22 may be defined in the upper connecting body 330.

The connecting body 330, 340, and 350 may include a hollow connecting body 340 and a lower connecting body 350.

The hollow connecting body 340 may have a space therein, and the upper connecting body 330 may be connected to an upper portion of the hollow connecting body 340.

The hollow connecting body 340 may include a support portion supporting the lower connecting body 350 and the lid channel body 320. The support body may protrude from a lower portion of the hollow connecting body 340 and be disposed between the lower connecting body 350 and the lid channel body 320.

The fitting rib for fitting or separating the inner lid 300 into or from the lid connector 17 in the screw manner may protrude from an outer circumference of the hollow connecting body 340.

The lower connecting body 350 may be coupled to the lid channel body 320 to fix the lid channel body 320 to the hollow connecting body 340.

Hereinafter, an effect according to an implementation will be described as followings.

The user may hold and lift the lid 12 upward, and the lid 12 may rotate upward.

When the lid 12 rotates upward, the fermentation tank 11 may be opened.

As described above, when the lid 12 rotates upward, the inner tube portion IT of the tube T may move together with the lid 12 in the state of being accommodated in and connected to the lid 12.

The user may insert the container 3 into the space S1 of the fermentation tank 11 to make a beverage in the container 3, and may seat the container 3 on the fermentation tank 11.

After the container 3 is completely seated, the user may allow the lid 12 to rotate downward. Here, the lid 12 may cover the opening 17A of the fermentation tank 11 to close the space S1 of the fermentation tank 11.

As described above, when the lid 12 rotates downward, the lid channel P1 may be vertically connected to the container channel P2. Here, the tube T, the lid channel P1, and the container channel P2 may be connected to each other.

The beverage maker may make a beverage in the state in which the tube T, the lid channel P1, and the container channel P2 are connected to each other.

When the beverage is made by the beverage maker, ingredients such as water or additives may sequentially pass through the tube T, the lid channel P1, and the container channel P2 and then be introduced into the fermentation space S2 of the container 3 in the state in which the lid 12 closes the space S1 of the fermentation tank 11.

When the beverage is made by the beverage maker, a gas such as air may sequentially pass through the tube T, the lid channel P1, and the container channel P2 and then be introduced into the fermentation space S2 of the container 3 in the state in which the lid 12 closes the space S1 of the fermentation tank 11. The gas introduced into the fermentation space S2 may allow the beverage ingredients to increase in dissolved oxygen amount and help the beverage ingredients to be well mixed.

When the beverage is completely made by the beverage maker, the beverage maker may dispense the beverage of the container 3 to the outside. In this case, the beverage within the container 3 may sequentially pass through the container channel P2, the lid channel P1, and the tube T to move to the outside of the fermentation module 1. That is, in a state in which the lid 12 is not opened, the beverage maker may dispense the beverage within the container 3 to the outside.

When the beverage made in the beverage maker is completely dispensed, the user may hold the lid 12 to lift the lid 12 upward, and thus, the lid channel P1 may be separated from the container channel P2. The user may put the hand into the opening 17A of the fermentation tank 11 to take out the container 3 to the outside of the fermentation tank 11 and may recycle or discard the container 3.

Figure 5:
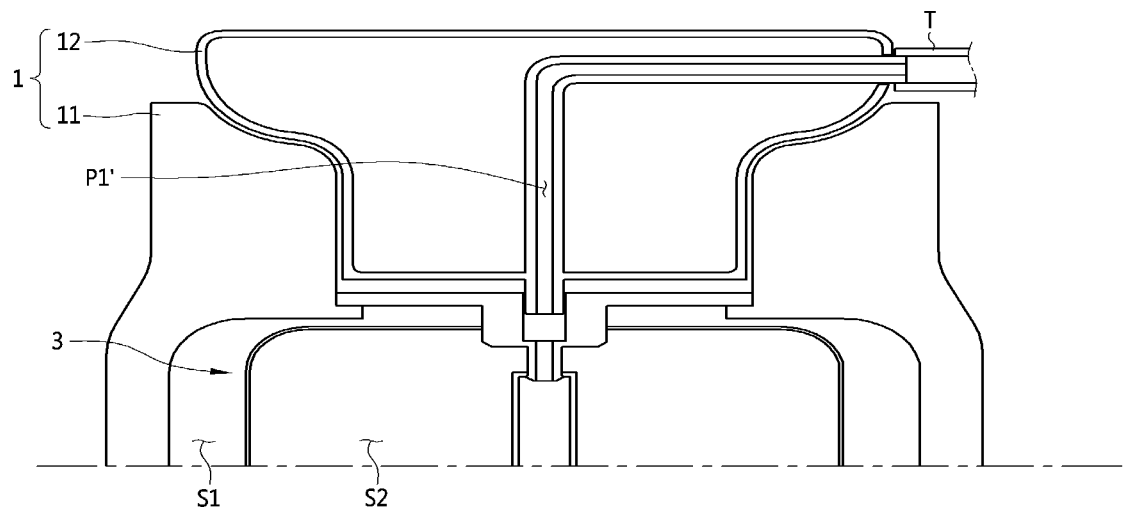
FIG. 5 is a schematic view illustrating an example fermentation module, an example container, and an example tube of an example beverage maker.
Figure 6:
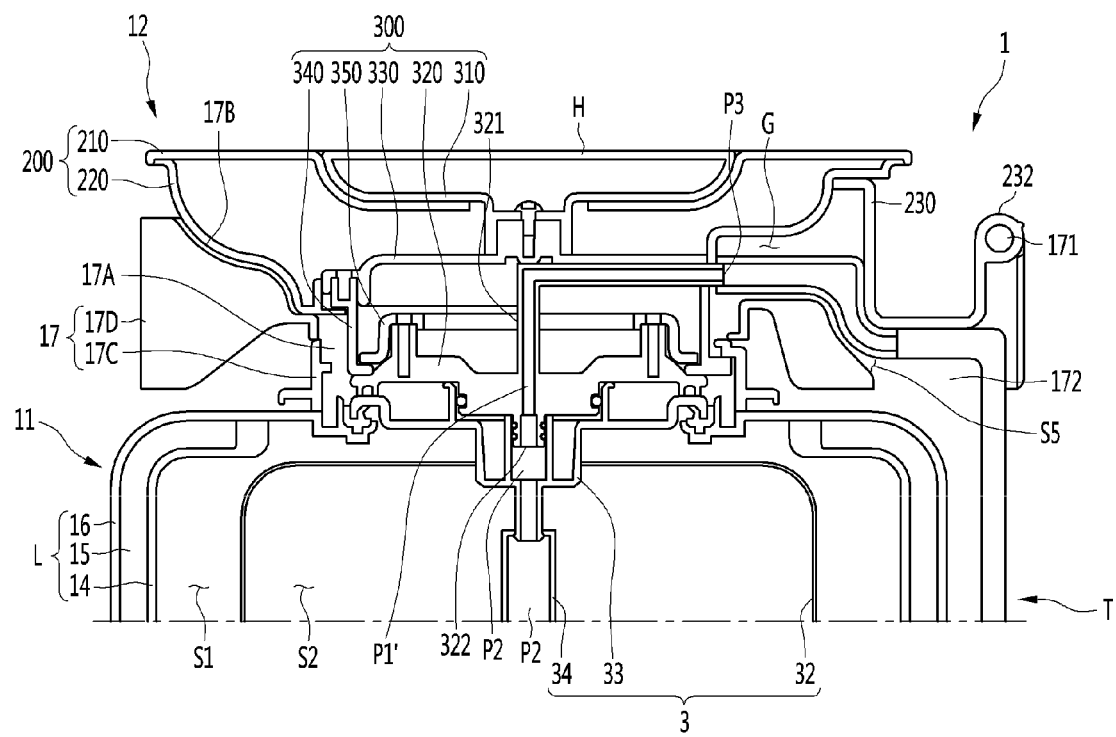
FIG. 6 is a cross-sectional view illustrating the fermentation module and the container of the beverage maker of FIG. 5.

FIG. 5 is a schematic view illustrating an example fermentation module, an example container, and an example tube of the beverage maker according to another implementation, and FIG. 6 is a cross-sectional view illustrating the fermentation module and the container of the beverage maker of FIG. 5.

A tube T according to this implementation may be connected to a lid channel P1' at the outside. For this, the lid channel P1' may extend to the outside of the lid 12.

The lid channel P1' may have one end P3 disposed outside the lid 12 and the other side that is directed to a lower side.

The lid channel P1' may have a shape that is bent at least once. The lid channel P1' may include a vertical channel that is lengthily disposed above a container channel P2 in a vertical direction and a tube connecting channel having a shape which is bent from the vertical channel and to which the tube T is connected.

When the tube T is connected to the lid channel P1' at the outside of the lid 12, the tube T may be easily cleaned, washed, or replaced.

The user may easily connect or separate the tube T connected to the lid 12 to or from the lid channel P1'.

In this implementation, when the lid 12 is closed, a gap G in which one end of the tube T is disposed may be defined between the lid 12 and a fermentation tank 11, particularly, between the lid 12 and a lid connector 17. A portion of the tube T may be inserted into the gap G and thus be protected by the lid 12 and the fermentation tank 11.

In this implementation, a tube cover protecting the tube T may be provided like the foregoing implementation, or the tube cover according to the foregoing implementation may be omitted.

When a fermentation module 1 includes a tube cover 240, the tube cover 240 may be inserted into the fermentation tank 11, particularly, the lid connector 17 to define a cover accommodating space S4 into which the tube cover 240 is inserted and accommodated. When the lid 12 is closed, a hinge member 230, a portion of the tube T, and the tube cover 240 may be accommodated in the tube cover accommodating space S4.

In some implementations, the fermentation module 1 does not include the tube cover 240. In such implementations, a tube accommodating space S5 into which a portion of the tube T is accommodated may be defined in the fermentation tank 11, for example, in the lid connector 17. In this case, when the lid 12 is closed, the hinge member 230 and a portion of the tube T may be accommodated in a tube accommodating space S5. When the lid 12 is closed, a portion of the tube T may be disposed between the hinge member 230 and the fermentation tank 11 and be protected by the hinge member 230 and the fermentation tank 11.

Since this implementation is equal or similar to the forgoing implementations in other constituents and effects except for the lid channel P1' and the tube T, the same constituent will be expressed by the same reference numeral, and also, their detailed description will be omitted.

Figure 7:
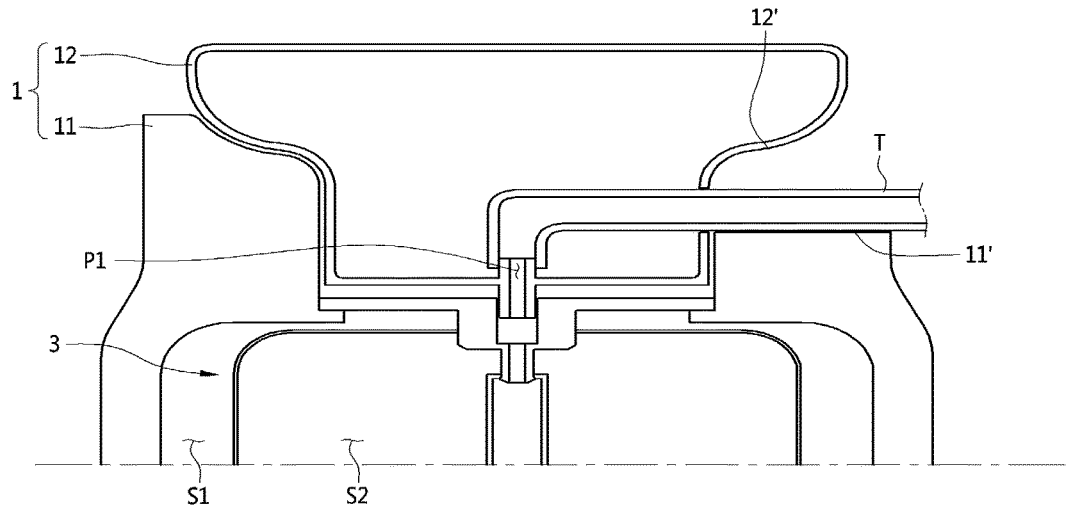
FIG. 7 is a schematic view illustrating an example fermentation module, an example container, and an example tube of an example beverage maker.
Figure 8:
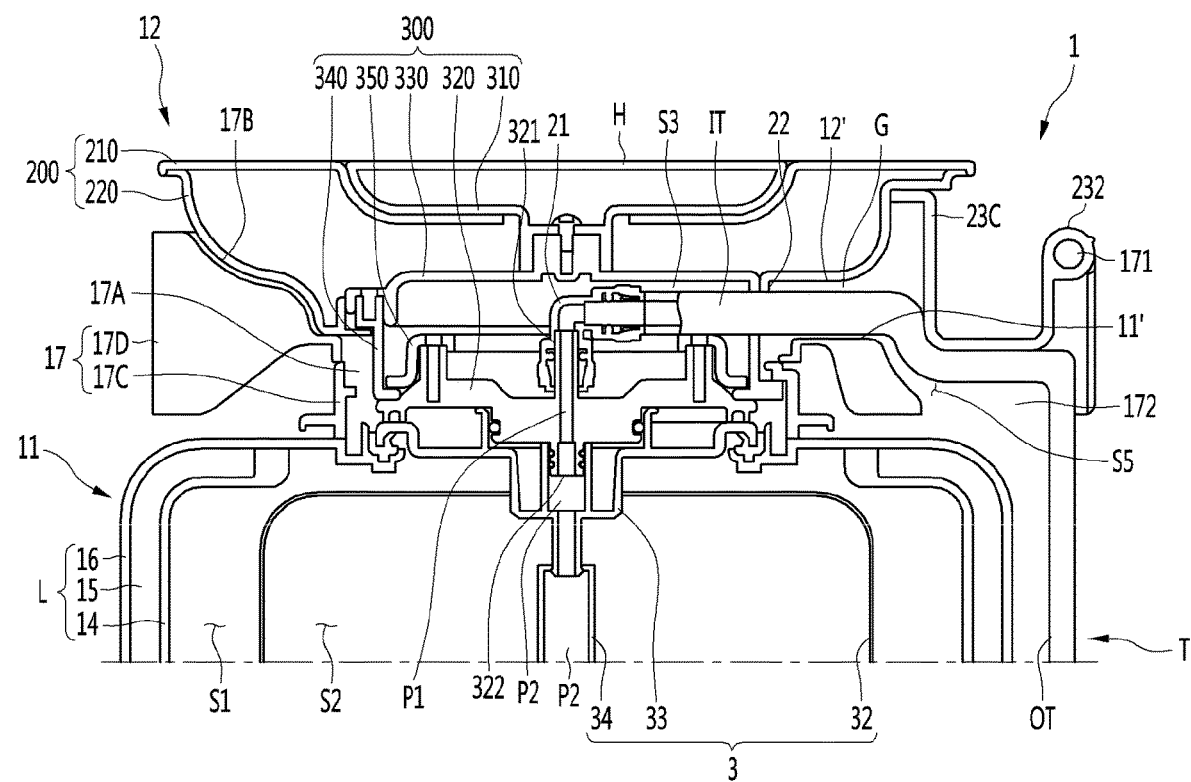
FIG. 8 is a cross-sectional view of the fermentation module and the container of the beverage maker of FIG. 7.

FIG. 7 is a schematic view of an example fermentation module, an example container, and an example tube of the beverage maker according to another implementation, and FIG. 8 is a cross-sectional view of the fermentation module and the container of the beverage maker of FIG. 7.

In this implementation, a portion of a tube T may be disposed between a lid 12 and a fermentation tank 11. When the lid 12 is closed, a gap G in which a portion of the tube T is disposed may be defined between the lid 12 and the fermentation tank 11, particularly, between the lid 12 and a lid connector 17.

The tube T may be connected to the lid channel P1 within the lid 12 like the foregoing implementation or may be connected to the lid channel P1' extending to the outside of the lid 12 outside the lid 12 like the foregoing another implementation.

An upper facing surface 12' that is directed to a portion of the tube T may be disposed on the lid 12. Also, a lower facing surface 11' that is directed to a portion of the tube T may be disposed on the fermentation tank 11. When the lid 12 is closed, the upper facing surface 12' and the lower facing surface 11' may be vertically spaced apart from each other with the tube T therebetween.

An upper accommodating groove into a portion of the tube T is accommodated may be defined in the upper facing surface 12' of the lid 12.

A lower accommodating groove into a portion of the tube T is accommodated may be defined in the lower facing surface 11' of the fermentation tank 11.

When the upper accommodating groove is defined in the lid, and the lower accommodating groove is defined in the fermentation tank, a portion of the tube T may be accommodated in a space defined between the upper accommodating groove and the lower accommodating groove. In this case, the lid 12 may support and protect the tube T in the state of being closely attached to the fermentation tank 11.

In some implementations, in the state in which the container closes the lid accommodated in the fermentation tank, the fluid may be accessible through the tube, the lid channel, and the container channel to minimize the possibility of introduction of the foreign substances such as dusts into the container, thereby cleanly making a beverage.

In some implementations, since the tube is connected to the lid channel in the tube accommodating space defined in the lid, the portion at which the lid and the lid channel are connected to each other may be invisible from the outside, and also, the introduction of the foreign substances through the portion at which the lid and the lid channel are connected to each other may be minimized.

In some implementations, the tube may be protected by the tube cover to minimize the damage of the tube and more cleanly maintain the tube.

In some implementations, the portion of the tube may be accommodated between the hinge member and the tube cover so as to be restricted in random movement, and thus, the tube may be stably fixed.

In some implementations, the tube may be connected to the lid channel at the outside so that the tube and the lid are easily connected to and separated from each other, thereby facilitating the service of the tube.

In some implementations, the portion of the tube may be disposed between the lid and the fermentation tank so as to be fixed by the lid and the fermentation tank. Thus, the tube may be protected by the lid and the fermentation tank, and the outer surface of the tube may be more cleanly maintained.

Also, since the tube is connected to the lid by passing through the fermentation tank, when the lid is closed, the tube may be minimally visible from the outside to realize the simple and elegant outer appearance.

The above-disclosed subject matter is to be considered illustrative, and not restrictive, and the appended claims are intended to cover all such modifications, enhancements, and other implementations, which fall within the scope of the present disclosure.

Thus, the implementation of the present disclosure is to be considered illustrative, and not restrictive.

Therefore, the scope of the present disclosure is defined not by the detailed description of the invention but by the appended claims, and all differences within the scope will be construed as being included in the present disclosure.

What is claimed is:

1. A beverage maker comprising:
a fermentation module comprising a fermentation tank that defines an inner space, and a lid assembly that is configured to open and close at least a portion of the inner space; and
a container configured to be accommodated in the inner space of the fermentation tank, the container comprising a container channel configured to guide flow of fluid,
wherein the lid assembly comprises:
a lid channel connected to the container channel,
a tube connected to the lid channel,
an outer lid,
an inner lid disposed at the outer lid and configured to rotate relative to the fermentation tank,
a hinge member connected to the outer lid and rotatably connected to the fermentation tank, and
a tube cover connected to the outer lid and configured to cover the tube,
wherein the tube cover defines a cover through-hole configured to receive the tube, and
wherein at least one of the hinge member or the tube cover defines an accommodating space configured to accommodate a portion of the tube between the hinge member and the tube cover.

2. The beverage maker according to claim 1, wherein the lid assembly defines a tube through-hole configured to receive the tube, and
wherein the accommodating space is located inside of the lid assembly.

3. The beverage maker according to claim 2, wherein the tube comprises:
an inner tube portion disposed in the accommodating space and configured to connect to the lid channel; and
an outer tube portion that extends from the inner tube portion and that is disposed outside of the fermentation tank.

4. The beverage maker according to claim 1, wherein the outer lid and the inner lid define a tube through-hole configured to receive the tube, and
wherein the accommodating space is located inside of the inner lid and configured to accommodate a portion of the tube inserted into the tube through-hole.

5. The beverage maker according to claim 1, wherein the lid channel has an end that extends to an outside of the lid assembly, and
wherein the tube is connected to the end of the lid channel at the outside the lid assembly.

6. The beverage maker according to claim 5, wherein the lid channel includes one or more bent portions.

7. The beverage maker according to claim 1, wherein a portion of the tube is disposed between the lid assembly and the fermentation tank.

8. The beverage maker according to claim 1, wherein the fermentation tank defines a tube through-hole configured to receive the tube.

9. The beverage maker according to claim 8, wherein the fermentation tank comprises:
a lower fermentation tank that defines the inner space; and
a lid connector disposed at the lower fermentation tank and configured to connect to the lid assembly, the lid connector defining the tube through-hole.

10. The beverage maker according to claim 9, wherein the lid connector has a top surface that defines a lid seating groove configured to seat the lid assembly.

11. A beverage maker comprising:
a fermentation module comprising a fermentation tank that defines an inner space, and a lid that is configured to open and close at least a portion of the inner space; and
a container configured to be accommodated in the inner space of the fermentation tank, the container comprising a container channel configured to guide flow of fluid,
wherein the lid comprises:
a lid channel connected to the container channel, and
a tube connected to the lid channel,
wherein the fermentation tank defines a tube through-hole configured to receive the tube,
wherein the fermentation tank comprises:
a lower fermentation tank that defines the inner space, and
a lid connector disposed at the lower fermentation tank and configured to connect to the lid, the lid connector defining the tube through-hole,
wherein the beverage maker further comprises a tube cover configured to surround a portion of an outer surface of the tube, and
wherein the lid connector defines a tube cover accommodating space configured to accommodate the tube cover.

12. The beverage maker according to claim 11, wherein the tube cover defines a cover through-hole configured to receive the tube.

13. A beverage maker comprising:
a fermentation tank that defines an inner space;
a container configured to be accommodated in the inner space, the container comprising a container channel configured to guide flow of fluid;
a lid connected to the fermentation tank through a hinge member and configured to open and close at least a portion of the inner space, the lid comprising a lid channel connected to the container channel; and
a tube connected to the lid channel,
wherein the lid defines:
a tube through-hole configured to receive the tube, and
an accommodating space configured to accommodate a portion of the tube inserted into the tube through-hole, and
wherein the tube extends along a lower side of the hinge member.

14. A beverage maker comprising:
a fermentation tank that defines an inner space;
a container configured to be accommodated in the inner space, the container comprising a container channel configured to guide flow of fluid;
a lid connected to the fermentation tank through a hinge member and configured to open and close at least a portion of the inner space, the lid comprising a lid channel connected to the container channel;
a tube connected to the lid channel; and
a tube cover configured to surround a portion of an outer surface of the tube,
wherein the lid defines:
a tube through-hole configured to receive the tube, and
an accommodating space configured to accommodate a portion of the tube inserted into the tube through-hole, and wherein the fermentation tank defines a tube cover accommodating space configured to accommodate the tube cover.

15. A beverage maker comprising:
a fermentation tank that defines an inner space;
a container configured to be accommodated in the inner space, the container comprising a container channel configured to guide flow of fluid;
a lid connected to the fermentation tank through a hinge member and configured to open and close at least a portion of the inner space, the lid comprising a lid channel connected to the container channel; and
a tube connected to the lid channel,
wherein the lid channel has an end that extends to an outside of the lid,
wherein the tube is connected to the end of the lid channel at the outside the lid, and
wherein a portion of the tube extends along a lower side of the hinge member.

\* \* \* \* \*